United States Patent
Choi et al.

(10) Patent No.: US 8,358,935 B2
(45) Date of Patent: Jan. 22, 2013

(54) METHOD AND APPARATUS FOR GENERATING VISIBLE SIGNAL FOR DATA TRANSMISSION FRAME IN VISIBLE-LIGHT COMMUNICATION SYSTEM

(75) Inventors: Jeong-Seok Choi, Yongin-si (KR); Dae-Kwang Jung, Suwon-si (KR); Hong-Seok Shin, Suwon-si (KR); Kyung-Woo Lee, Yongin-si (KR); Dong-Jae Shin, Seoul (KR); Sung-Bum Park, Suwon-si (KR); Yoo-Jeong Hyun, Seongnam-si (KR); Seong Hoon Hyun, legal representative, Sung Nam (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 713 days.

(21) Appl. No.: 12/217,943

(22) Filed: Jul. 10, 2008

(65) Prior Publication Data

US 2009/0185802 A1   Jul. 23, 2009

(30) Foreign Application Priority Data

Jul. 10, 2007   (KR) .......................... 10-2007-0069112

(51) Int. Cl.
*H04B 10/00*   (2006.01)

(52) U.S. Cl. ............ 398/172; 398/25; 398/38; 398/118; 398/119; 398/120; 398/127; 398/128; 398/129; 398/130; 398/131

(58) Field of Classification Search ................. 398/25, 398/103, 118–120, 126–131, 172
See application file for complete search history.

(56) References Cited

U.S. PATENT DOCUMENTS

| | | | |
|---|---|---|---|
| 5,808,760 A * | 9/1998 | Gfeller | 398/27 |
| 7,639,951 B2 * | 12/2009 | Hirayama | 398/128 |
| 7,715,723 B2 * | 5/2010 | Kagawa et al. | 398/131 |
| 2005/0238357 A1 * | 10/2005 | Farrell | 398/119 |
| 2006/0062099 A1 * | 3/2006 | Yazaki et al. | 369/44.11 |
| 2007/0123169 A1 * | 5/2007 | Lu et al. | 455/63.1 |
| 2007/0147843 A1 * | 6/2007 | Fujiwara | 398/118 |
| 2008/0247759 A1 * | 10/2008 | Bahar | 398/118 |

* cited by examiner

*Primary Examiner* — Li Liu

(74) *Attorney, Agent, or Firm* — Cha & Reiter, LLC

(57) ABSTRACT

A method for generating a visible signal for a data transmission frame in a visible-light communication system includes: receiving specific data constituted by a plurality of frames from a sender; checking and converting a received signal strength indication (RSSI) signal measured from the sender; whenever each frame of the specific data is consecutively received, checking the converted RSSI, determining a level of a visible signal for distinctively displaying a state of a corresponding communication channel, and transmitting the level of the visible signal to the sender; and when reception of the specific data has finished, transmitting a corresponding response message to the sender, according to whether the specific data has been successfully received.

18 Claims, 5 Drawing Sheets

METHOD AND APPARATUS FOR GENERATING VISIBLE SIGNAL FOR DATA TRANSMISSION FRAME IN VISIBLE-LIGHT COMMUNICATION SYSTEM

CLAIM OF PRIORITY

This application claims priority to application entitled "method and apparatus for generating visible signal for data transmission frame in visible-light communication system," filed with the Korean Intellectual Property Office on Jul. 10, 2007 and assigned Serial No. 2007-69112, the contents of which are incorporated herein by reference.

BACKGROUND OF THE INVENTION

1. Field of the Invention

The present invention relates to a visible-light communication system, and more particularly to a visible-light communication system in which a user can identify the state of a communication channel in real time during data reception mode.

2. Description of the Related Art

In general, a wireless mobile communication terminal is equipped to display, a received signal strength in a predetermined position of a display unit so as to provide a received signal strength indication (RSSI) signal from a base station in real time. FIG. 1 is a block diagram illustrating the configuration of a wireless mobile communication terminal displaying the reception intensity according to the conventional wireless communication scheme. When a wireless mobile communication terminal is powered on, a wireless transmission/reception unit 100 transfers an RSSI signal received from an exterior in a scheme according to a wireless communication standard. The RSSI signal is defined as a voltage level, and is input to a wireless controller 110. The voltage level of the input RSSI signal is converted into a digital signal by an A/D converter 111, and then stored in a temporary RSSI storage unit 112, which is a specified register. The stored RSSI is used to provide the current state of a wireless communication to a user using antenna bars in a display unit 120.

FIG. 2 is a view schematically illustrating a data transmission scheme of a data link layer in a conventional wireless communication system using infrared rays. According to the infrared link access protocol (IrLAP) of the infrared data association (IrDA), a sender transmits data to a receiver, and then the receiver transmits an Acknowledge (ACK) signal in response to the transmitted data, as shown FIG. 2. Generally, when a window size, representing the number of packets or frames which a sender can consecutively transmit through a communication channel without waiting for an Acknowledge (ACK) signal from a receiver, is one, the receiver must transmit an ACK signal as a response whenever receiving this one data frame. The IrDA allows the window size to be a maximum of 128, so that it is possible increase the throughput of data. However, the IrDA using infrared rays have disadvantages in that it takes a long time to transmit contents because a data rate is limited to a few Mbps, and the user cannot visibly identify the state of a communication channel. For these reasons stated above, a visible-light communication system using visible light has been recently spotlighted because the visible-light communication system can achieve low-power high-speed communication at a low price by constructing a communication channel using an element, such as a light emitting diode (LED). The implementation of LED is noted as an ideal choice in the next generation. Such a visible LED serves as an access point (AP) in a visible-light communication system. Since it is possible to perceive the visible light, which is a communication medium, owing to the visible characteristic of the visible light, (e.g. a space illuminated by a room lamp), a user can easily recognize a range to which the visible light reaches.

That is, when an LED is installed in a room provided with a conventional bulb lighting, a visible-light communication system can be easily implemented without installing an additional system as LED visible light communication is possible.

In the visible light communication, information is transmitted by switching on and off the light emitted from a light emitting diode as an indicator at a high speed. Thus, when a terminal, such as a PC, is installed within a range which light can reach, it is possible to use high-speed Internet communication or the like, without wiring.

As shown in FIGS. 1 and 2, according to the conventional wireless communication technology using an RF or the conventional technology using infrared rays, since the current state of a communication channel is displayed simply using antenna bars, and an Acknowledge signal or Negative Acknowledge signal, representing whether data has been successfully received, cannot be generated and transmitted before the reception of the data has been completed. Also, the user cannot identify a channel state and a data rate in real time while data is being received. Therefore, there is a need to develop an improved communication protocol applicable to a visible-light communication system.

SUMMARY OF THE INVENTION

Accordingly, the present invention has been made to solve the above-mentioned problems occurring in the prior art and provides additional advantages, by providing a system and method for generating a visible signal for a data transmission frame so that the user can directly identify the state of a communication channel while data is being received. That is, by generating visible signals when the data is transmitted/received between a sender and a receiver by a data link layer in a visible-light communication system which implements a visible communication network.

In accordance with an aspect of the present invention, a method for generating a visible signal for a data transmission frame in a visible-light communication system includes: receiving a specific data constituted by a plurality of frames from a sender; checking and converting a received signal strength indication (RSSI) signal measured from the sender; whenever each frame of the specific data is consecutively received, checking the converted RSSI, determining the level of a visible signal for distinctively displaying a state of a corresponding communication channel and transmitting the level of the visible signal to the sender; and when reception of the specific data has finished, transmitting a corresponding response message to the sender according to whether the specific data has been successfully received.

In accordance with another aspect of the present invention, an apparatus for generating a visible signal for a data transmission frame in a visible-light communication system includes: a visible light communication (VLC) transmission/reception unit for receiving data from a sender, outputting the received data, and transmitting data input from a VLC controller to the sender; the VLC controller for converting an RSSI signal, among data received from the VLC transmission/reception unit, into a digital signal, temporarily storing the converted RSSI signal, demodulating specific data constituted by a plurality of frames, and transferring the demodulated specific data; and a VLC protocol unit for checking the RSSI signal temporarily-stored in the VLC controller every time each frame of the specific data is input from the VLC controller, generating and outputting a visible signal for distinctively displaying a state of a communication channel according to the state of a corresponding RSSI signal for each frame by visible light, and generating and outputting a response message according to whether the specific data has been successfully received.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Hereinafter, an embodiment of the present invention will be described with reference to the accompanying drawings. In the below description, many particular items such as a detailed component device are shown, but these are given only for providing the general understanding of the present invention. It will be understood by those skilled in the art that various changes in form and detail may be made within the scope of the present invention.

First, it should be noted that the teachings of the present invention are applicable to a visible-light communication system, and more particularly to a communication protocol for an operation performed by a data link layer, which manages data input/output through a physical link within a network, among the seven layers of the Open Systems Interconnection (OSI) model. In addition, according to an exemplary embodiment of the present invention, the visible-light communication system includes visible-light-dedicated transmission/reception apparatuses so as to provide visibility notice on the progress of data transmission between the transmission/reception apparatuses.

Figure 1:
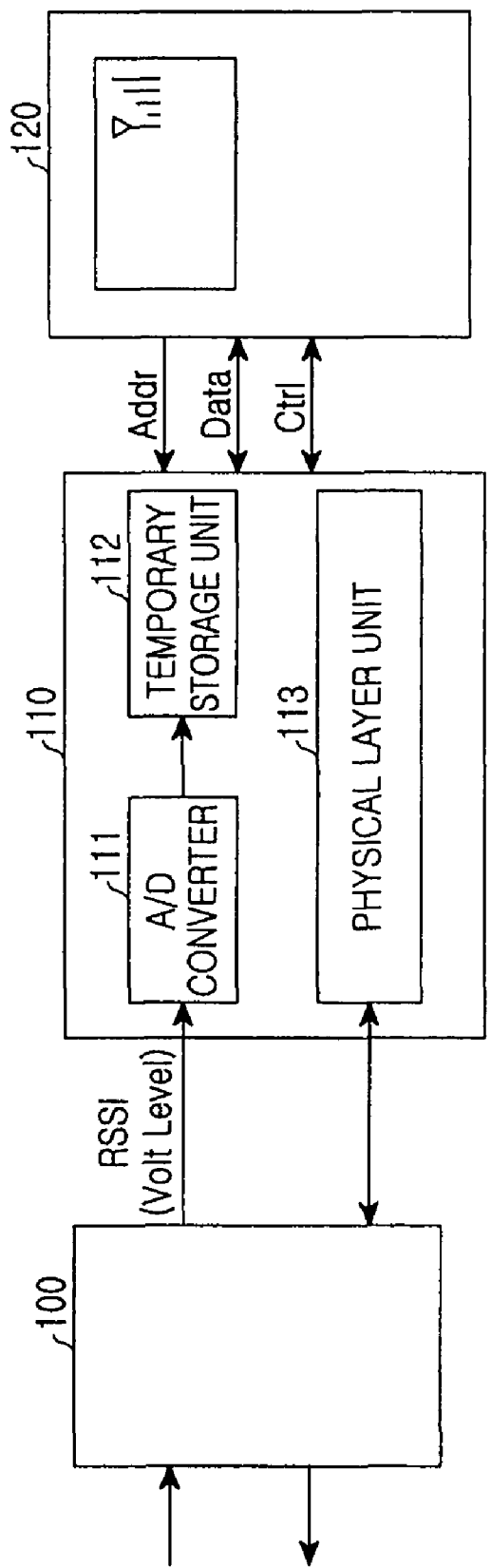
FIG. 1 is a block diagram illustrating the internal configuration of a wireless mobile communication terminal displaying the intensity of a received signal according to a conventional wireless communication scheme.
Figure 2:
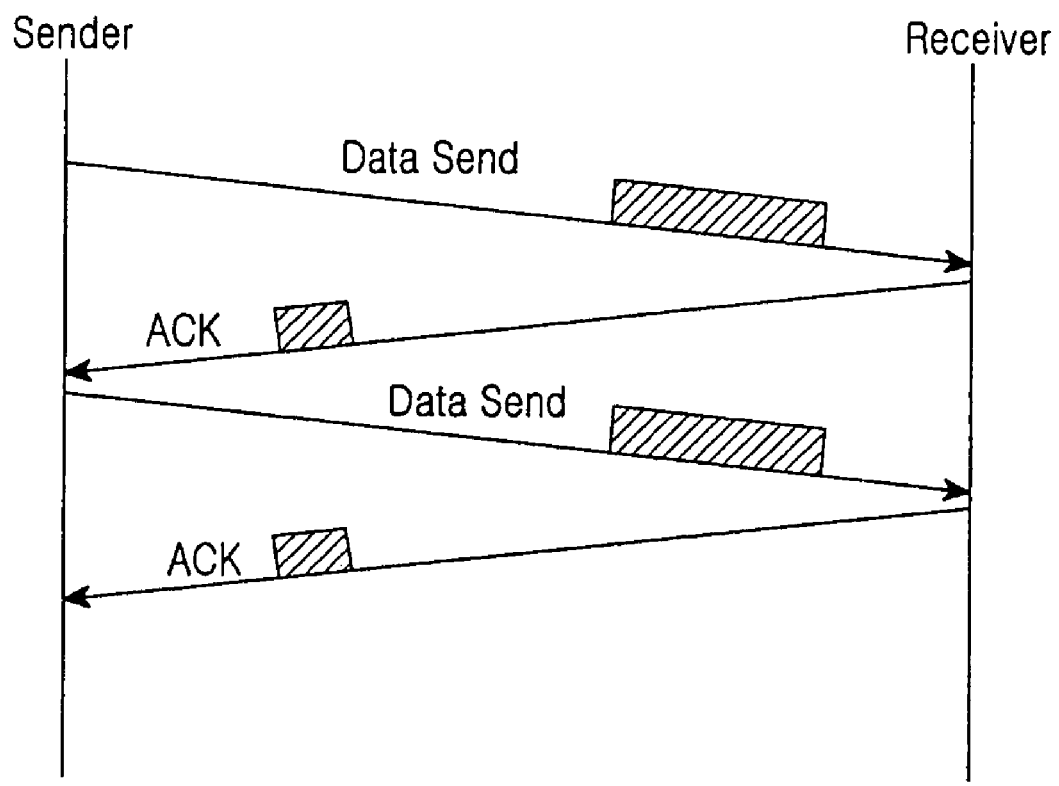
FIG. 2 is a view schematically illustrating a data transmission scheme of a data link layer in a conventional wireless communication system using infrared rays.
Figure 3:
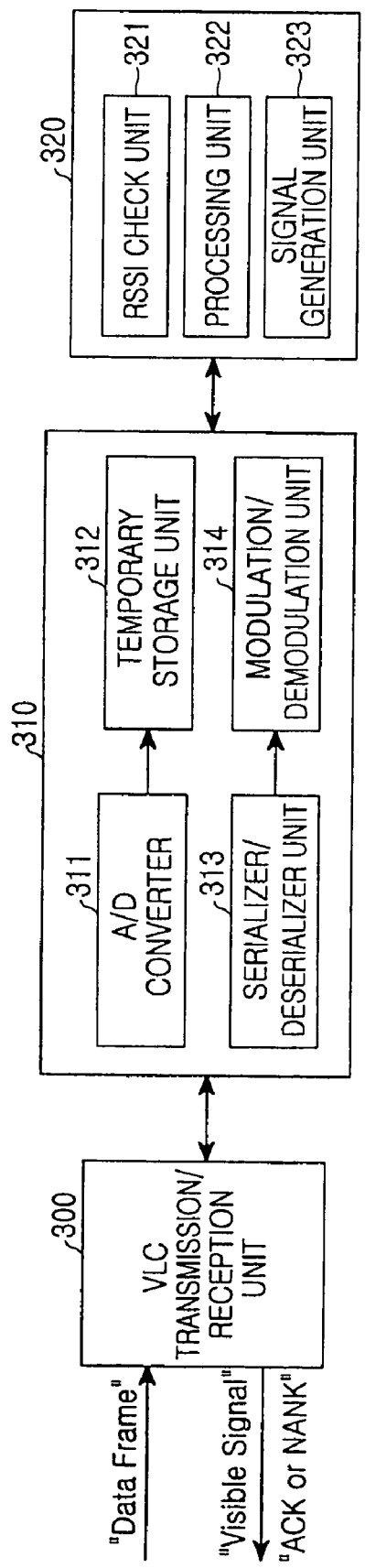
FIG. 3 is a block diagram illustrating the internal configuration of a visible-light communication terminal in a visible-light communication system according to an exemplary embodiment of the present invention.

FIG. 3 is a block diagram illustrating the internal configuration of a visible-light communication terminal in a visible-light communication system according to an exemplary embodiment of the present invention. As shown, the visible-light communication terminal includes a VLC transmission/reception unit 300, a VLC controller 310, and a VLC protocol unit 320.

In operation, the VLC transmission/reception unit 300 receives data from a sender (not shown), and then outputs the received data. In addition, the VLC transmission/reception unit 300 transmits data received from the VLC controller 310 to the sender. In detail, specific data, which the user desires to transmit or receive through a specific terminal, is input to the VLC transmission/reception unit 300. In this case, the specific data corresponds to communication data constituted by a plurality of frames, and, for example, may be and not limited to a moving picture file, a music file, etc. A received signal strength indication (RSSI) signal, which represents the reception power measured by the sender is also input from the transmission side.

The VLC controller 310 includes an A/D converter 311, a temporary storage unit 312, a serializer/deserializer (SerDes) unit 313, and a modulation/demodulation unit 314.

Among data received through the VLC transmission/reception unit 300, the RSSI signal is converted into a digital signal through the A/D converter 311, and then temporarily stored in the temporary storage unit 312. Also, the serializer/deserializer unit 313 converts specific data, which is constituted by a plurality of frames and is transmitted through one communication path, into a serial signal or parallel signals so as to be processed by the mobile terminal, and the modulation/demodulation unit 314 demodulates and outputs the converted specific data.

The VLC protocol unit 320 includes an RSSI check unit 321, a processing unit 322, and a signal generation unit 323.

When the RSSI check unit 321 checks and outputs an RSSI signal stored in the temporary storage unit 312, the processing unit 322 identifies the RSSI value of each currently-received frame, determines the level of a visible signal that is to be displayed to a user, which distinctively expresses the states of a communication channel by the variation of visible light intensity, and outputs the visible signal indicative of the determined level. That is, the value of a current RSSI signal corresponding to each received frame is checked, and the level of the visible signal to be displayed is determined in comparison with the preset level values. Here, the level of a visible signal represents a brightness and a pattern of the visible signal according to an RSSI value of each frame. Moreover, the pattern can be light flashing pattern corresponding to signals such as 11111 11111, 11110 11111, 11110 11110, 11101 11100, 11001 11100, 10001 11100, 00001 11100, 00001 11000, 00001 10000, 00001 00000, 00000 00000 . . . , wherein '1' indicates existence of a signal and '0' indicates absence of existence of the signal.

The brightness and pattern of a visible signal is selectively adjusted by using an LED element or the like installed in a display unit in such a manner as to distinguish the visible signal transmitted from a receiver through a change in the speed of flashing light and a change in color according to the lighting speed.

For example, when the RSSI check unit 321 checks that the RSSI signal value of a received frame corresponds to a "good" state based on the preset level values, the level of a visible signal corresponding to the RSSI value of the received frame corresponds to a good state. Then, the signal generation unit 323 generates a visible signal in which a length of a signal frame is set long or the speed of flashing of the light is at maximum. Such a visible signal represents a signal of high visibility and easily recognized by the user as the visible signal is continually projected for a long time. Such a long visible signal maximizes a lighting speed, thereby displaying a relatively darker color, for example, the darkest red color when a red LED element is used.

Meanwhile, the aforementioned components have been described on the assumption that the visible-light communication terminal corresponds to a receiver for generating a visible signal using an RSSI signal and transmitting the generated visible signal to a sender. Here, it should be noted that the visible-light communication terminal is a visible-light-communication-dedicated terminal which can operate as both a sender and a receiver.

Therefore, the internal construction of the visible-light communication terminal shown in FIG. 3 further includes a display unit (not shown) for receiving a visible signal, and displaying the received visible signal through a laser diode (LD), a light-emitting diode (LED), or an array of the diodes.

An embodiment of a method of generating a visible signal according to the present invention, as described above, will be described later in detail with reference to FIG. 4.

When the processing unit 322 recognizes that reception of specific data has finished, that is, when a frame representing the completion of the specific data has been received, the signal generation unit 323 generates a response message according to whether the specific data has been successfully received, and outputs the response message. The response message may be an Acknowledge (ACK) message representing that the data has been successfully received, or a Negative Acknowledge (NACK) message representing that the data has not been successfully received. Therefore, while the visible signal is generated every frame, the response message is generated once after reception of specific data has finished.

FIGS. 4A to 4D are views schematically illustrating the transmission of visible signals to showing different states of a communication channel upon transmitting/receiving data in a visible-light communication system according to an exemplary embodiment of the present invention.

It should be noted that terms "good," "normal," "poor," and "disconnect," which are recorded at an upper portion of each channel-state display unit in FIGS. 4A to 4D, respectively, represent levels of a visible signal, which are lighted depending on each communication channel state.

Figure 4A:
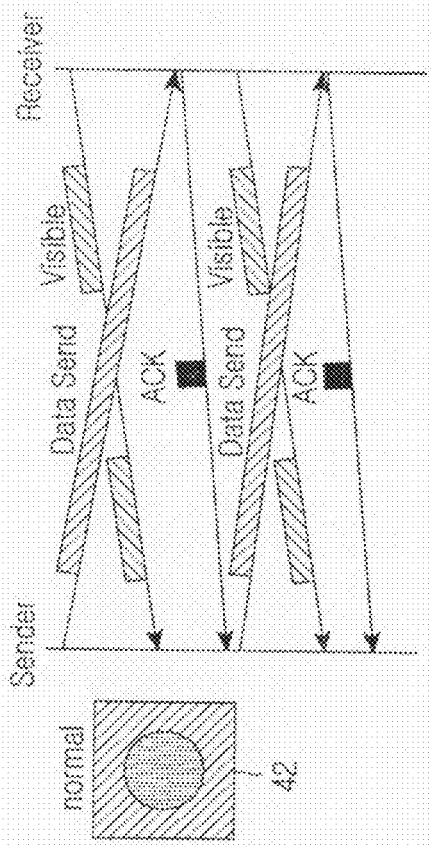
FIGS. 4A to 4D are views schematically illustrating transmission of visible signals distinguished depending on states of a communication channel upon transmitting/receiving data in a visible-light communication system according to an exemplary embodiment of the present invention.

First, FIG. 4A shows a case where a sender transmits specific data constituted by a plurality of frames to a receiver, and the receiver transmits a visible signal (i.e. data) at a predetermined interval, i.e. every time each frame of the specific data is received, while receiving the specific data, and transmits an ACK signal, which is a response message to the reception of the specific data, to the sender when the reception of the specific data has finished. In FIG. 4A, the RSSI check unit 321 of the VLC protocol unit 320 in the receiver recognizes that an RSSI signal measured from the sender is in a "good" state, thereby transmitting a visible signal corresponding to the "good" state. The visible signal corresponding to the "good" state means a visible signal in which a length of a signal frame is set long or a speed of flashing of the light is maximum.

Figure 4B:
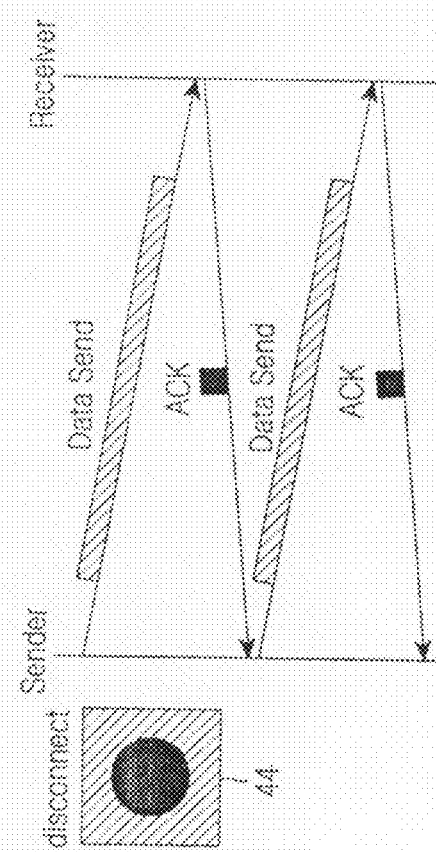

FIG. 4B shows a case where a sender transmits specific data constituted by a plurality of frames to a receiver, and the receiver transmits a visible signal (i.e. data) at a predetermined interval, i.e. every time each frame of the specific data is received, while receiving the specific data, the sender selectively adjusts data transmission depending on a brightness and a pattern of the visible signal received from the receiver, and the receiver transmits an ACK signal, which is a response message to the reception of the specific data, to the sender when the reception of the specific data has finished. In FIG. 4B, the RSSI check unit 321 of the VLC protocol unit 320 in the receiver recognizes that an RSSI signal measured from the sender is in a "normal" state, thereby transmitting a normal-length visible signal corresponding to the "normal" state, as a visible signal which has the brightness and pattern level corresponding to each frame of the specific data. In this case, according to the brightness of the visible signal, since lighting is repeated at a normal speed lower than that in the "good" state, which causes the longest visible signal to be generated, for example, a standard red color is displayed when a red LED element is used, in a channel-state display unit 42 of the sender.

Figure 4C:
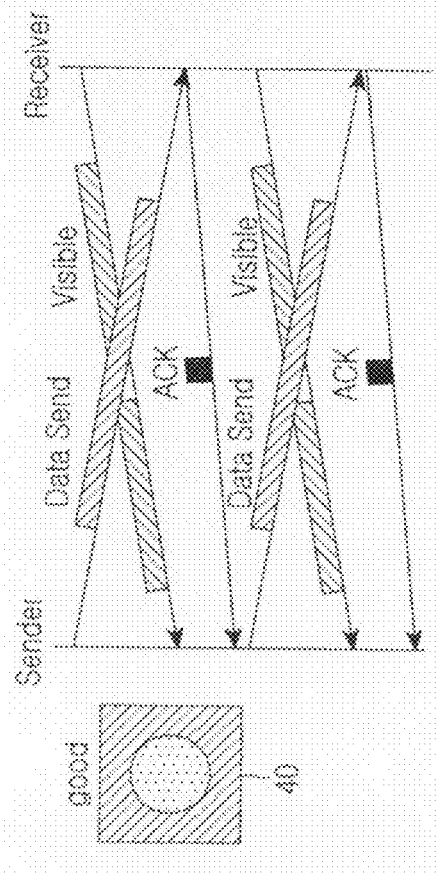

FIG. 4C shows a case where a sender transmits specific data constituted by a plurality of frames to a receiver, and the receiver transmits a visible signal (i.e. data) at a predetermined interval, i.e. every time each frame of the specific data is received, while receiving the specific data, and transmits an ACK signal, which is a response message to the reception of the specific data, to the sender when the reception of the specific data has finished. In FIG. 4C, the RSSI check unit 321 of the VLC protocol unit 320 in the receiver recognizes that an RSSI signal measured from the sender is in a "poor" state, thereby transmitting a short visible signal corresponding to the "poor" state, as a visible signal which has the brightness and pattern level corresponding to each frame of the specific data. In this case, according to the brightness of the visible signal, since lighting is repeated at a speed lower than that in the "normal" state, which causes the normal-length visible signal to be generated, for example, a pale red color is displayed when a red LED element is used, in a channel-state display unit 43 of the sender.

Figure 4D:
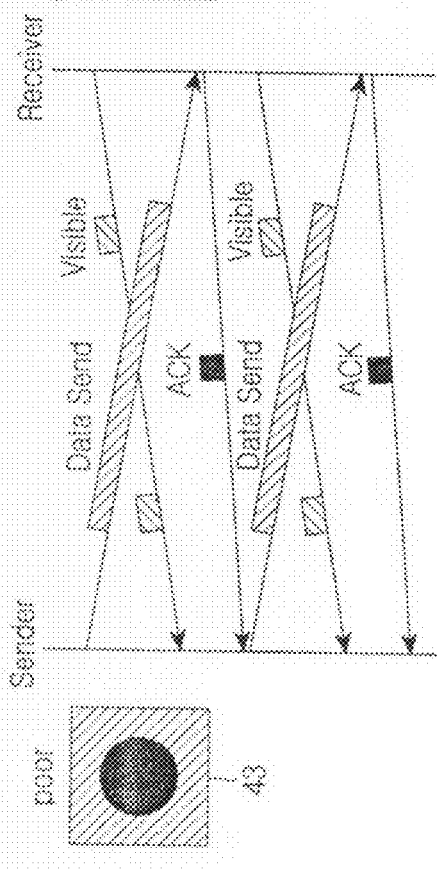

FIG. 4D shows a case where a sender transmits specific data constituted by a plurality of frames to a receiver, and the receiver transmits an NACK signal in order to notify the sender that the receiver has not received the data. Since the receiver receives no signal, there is no visible signal generated every time a data frame is received, so that an lighting operation is not performed, thereby displaying a wait state in a channel-state display unit 44.

Hereinafter, a method for generating a visible signal for a data transmission frame in a visible-light communication system according to an exemplary embodiment of the present invention will be described with reference to the aforementioned components and FIG. 5.

Figure 5:
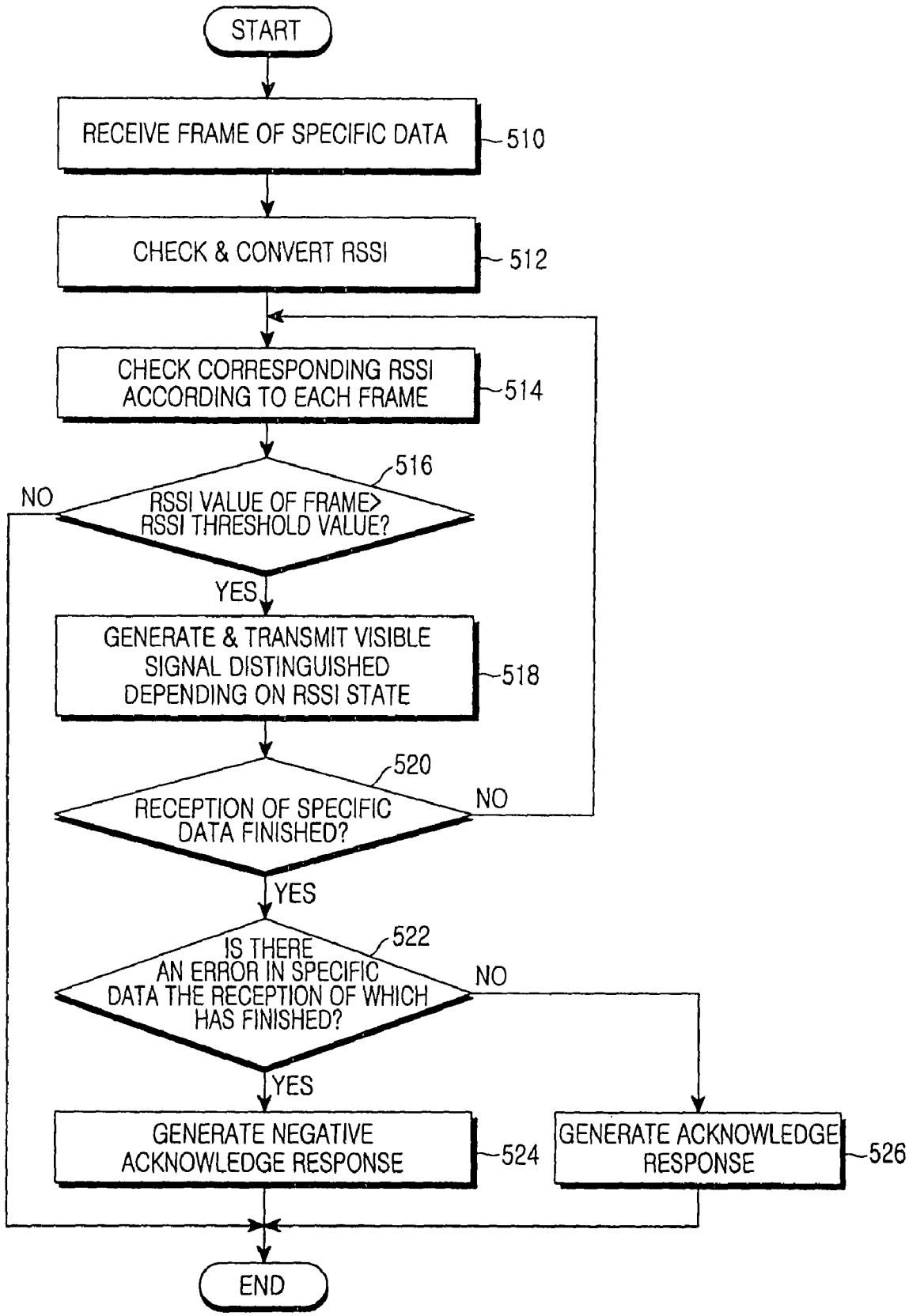
FIG. 5 is a flowchart illustrating a method for generating a visible signal for a data transmission frame in a visible-light communication system according to an exemplary embodiment of the present invention.

FIG. 5 is a flowchart illustrating a method for generating a visible signal for a data transmission frame in a visible-light communication system according to an exemplary embodiment of the present invention.

First, a receiver receives specific data constituted by a plurality of frames from a sender in step 510, and converts an RSSI signal measured from the sender into a digital signal through the VLC controller in step 512. Whenever consecutively receiving each frame of the specific data from the sender, the receiver checks an RSSI signal of the received frame in step 514. When the RSSI value of a received frame is greater than a preset RSSI threshold value as a result of the checking, the receiver generates a visible signal distinguished depending on the state of the RSSI signal, and transmits the generated visible signal to the sender in step 518.

Then, the receiver checks if the reception of the specific data has finished in step 520, and repeats steps 514 to 518 when the reception of the specific data has not been finished. In contrast, when the reception of the specific data has finished, the receiver determines if there is an error in the received specific data in step 522. When there is an error in the received specific data, the receiver generates and transmits a Negative Acknowledge response signal to the specific data, i.e. an NACK message, in step 524. In contrast, when there is no error in the received specific data, the receiver generates and transmits an Acknowledge response signal to the specific data, i.e. an ACK message, in step 526. In this case, when the sender receives an NACK message from the receiver, the sender re-transmits the corresponding data.

As described above, according to the present invention, since a visible signal is generated upon transmitting/receiving data in a visible-light communication system, and the generated visible signal can be recognized by the user in real time, it is possible to implement a low-power high-speed visible communication network environment at a low price in visible-light communication network environments which can be used in a limited space.

The method and apparatus for generating a visible signal for a data transmission frame in a visible-light communication system according to an exemplary embodiment of the present invention can be implemented through the aforementioned configuration and operations. While the present invention has been shown and described with reference to certain exemplary embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for generating a visible signal for a data transmission frame in a visible-light communication system, the method comprising:
    receiving data defined by a plurality of consecutive frames from a sender;
    converting a received signal strength indication (RSSI) signal of the received data in each frame to a digital signal,
    determining a state of a corresponding communication channel based on the converted RSSI, wherein the determined state is based on the converted RSSI being within preset limits, and
    transmitting a distinctively displayed visible signal based on the determined state to the sender, with a brightness and pattern according to RSSI value, for each frame of the plurality of frames;
    the sender selectively adjusting a data transmission responsive to the distinctively displayed visible signal; and
    upon completion of the data reception, transmitting a corresponding response message to the sender.

2. The method as claimed in claim 1, wherein the pattern for each RSSI value is a light flashing pattern with the same number of bits per pattern for each RSSI value, and a different number of 1's correlated with the RSSI value to thereby concurrently provide a different brightness for each RSSI value, where '1' indicates existence of visible light.

3. The method of claim 2, wherein the number of bits per pattern is ten, and each pattern is one of 1111 11111, 11110 11111, 11110 11110, 11101 11100, 11001 11100, 10001 11100, 00001 11100, 00001 11000, 00001 10000, 00001 00000 and 00000 00000.

4. The method as claimed in claim 1, wherein the distinctively displayed visible signal transferred to the sender is output by a light source.

5. The method as claimed in claim 4, wherein the light source comprises at least one of a laser diode (LD), a light-emitting diode (LED), and an array of the diodes.

6. The method as claimed in claim 1, further comprising transmitting a Negative Acknowledge (NACK) message for corresponding data when a value of the received RSSI is equal to or less than a threshold value.

7. An apparatus for generating a visible signal for a data transmission frame in a visible-light communication system, comprising:
    a visible light communication (VLC) transmission/reception unit for receiving data of a plurality of consecutive frames transmitted from a sender in a communication channel, outputting the received data, and transmitting data input from a VLC controller to the sender;
    the VLC controller for:
        converting an RSSI signal, among data received from the VLC transmission/reception unit, into a digital signal,
        temporarily storing the converted RSSI signal,
        demodulating specific data constituted by the plurality of frames, and
    transferring the demodulated specific data; and
    a VLC protocol unit for:
        checking the RSSI signal temporarily stored in the VLC controller for each frame of the specific data is input from the VLC controller to determine a state of a corresponding communication channel based on said RSSI signal being with preset limits,
        generating and transmitting a visible signal that is distinctively displayed according to the state of the communication channel, with a brightness and pattern according to RSSI value, for each frame of the plurality of frames of the data transmission, wherein said sender selectively adjusts data transmission based on the distinctively displayed visible signal, and
        generating and outputting a response message according to whether the specific data has been successfully received.

8. The apparatus as claimed in claim 7, wherein the VLC protocol unit generates and outputs a response message representing whether the specific data has been successfully received.

9. The apparatus as claimed in claim 7, wherein the response message corresponds to an Acknowledge (ACK) message or an Negative Acknowledge (NACK) message.

10. The apparatus of claim 7, wherein the pattern for each RSSI value is a light flashing pattern with the same number of bits per pattern for each RSSI value, and a different number of 1's correlated with the RSSI value to thereby concurrently provide a different brightness for each RSSI value, where '1' indicates existence of visible light.

11. The apparatus of claim 10, wherein the number of bits per pattern is ten, and each pattern is one of 1111 11111, 11110 11111, 11110 11110, 11101 11100, 11001 11100, 10001 11100, 00001 11100, 00001 11000, 00001 10000, 00001 00000 and 00000 00000.

12. A method for providing a real-time visible indication during data exchange in a visible-light communication system, the method comprising:
    transmitting, by a sender, data of a plurality of consecutive frames;
    comparing, by a receiver, a received signal strength indication (RSSI) for each of the plurality of frames to a predetermined threshold value;
    determining a state of a communication channel, wherein the state is determined based on the RSSI being with preset limits;
    the receiver generating and transmitting to the sender the real time visible indication based on the determined state, with a brightness and pattern according to RSSI value, for each frame of the plurality of frames; and
    upon completion of data reception of the plurality of frames, transmitting a corresponding response message to the sender, according to whether the plurality of frames has been successfully received.

13. The method of claim 12, wherein the level of visible indication is indicated by varying color and intensity of light.

14. The method of claim 12, wherein the visible indication is achieved by one of a laser diode (LD), a light-emitting diode (LED), and an array of the diodes.

15. The method of claim 12, wherein the corresponding response message is a Negative Acknowledge (NACK) message when an error is determined to exist in the received data.

16. The method of claim 12, wherein the corresponding response message is an ACK message when the data of the plurality of frames has been successfully received.

17. The method of claim 12, wherein the pattern for each RSSI value is a light flashing pattern with the same number of bits per pattern for each RSSI value, and a different number of 1's correlated with the RSSI value to thereby concurrently provide a different brightness for each RSSI value, where '1' indicates existence of visible light.

18. The method of claim 17, wherein the number of bits per pattern is ten, and each pattern is one of 1111 11111, 11110 11111, 11110 11110, 11101 11100, 11001 11100, 10001 11100, 00001 11100, 00001 11000, 00001 10000, 00001 00000 and 00000 00000.

* * * * *